(12) United States Patent
Wilder

(10) Patent No.: US 12,134,306 B2
(45) Date of Patent: Nov. 5, 2024

(54) AUTOMATIC WINDOW SHADE ASSEMBLY

(71) Applicant: Taiya Wilder, Mesa, AZ (US)

(72) Inventor: Taiya Wilder, Mesa, AZ (US)

( * ) Notice: Subject to any disclaimer, the term of this patent is extended or adjusted under 35 U.S.C. 154(b) by 411 days.

(21) Appl. No.: 17/553,322

(22) Filed: Dec. 16, 2021

(65) Prior Publication Data

US 2023/0191882 A1     Jun. 22, 2023

(51) Int. Cl.
| | | |
|---|---|---|
| *B60J 1/20* | (2006.01) | |
| *B60J 1/00* | (2006.01) | |
| *G06F 3/0484* | (2022.01) | |
| *G06F 3/0488* | (2022.01) | |

(52) U.S. Cl.
CPC .............. *B60J 1/2088* (2013.01); *B60J 1/002* (2013.01); *G06F 3/0484* (2013.01); *G06F 3/0488* (2013.01)

(58) Field of Classification Search
CPC ........ B60J 1/2088; B60J 1/002; B60J 1/2041; B60J 1/2016; B60J 1/026; G06F 3/0484; G06F 3/0488; B60S 1/026; H05B 3/84
See application file for complete search history.

(56) References Cited

U.S. PATENT DOCUMENTS

| | | | | |
|---|---|---|---|---|
| 5,664,615 A | * | 9/1997 | Baik | B60J 1/2088 |
| | | | | 160/370.21 |
| 5,884,731 A | * | 3/1999 | Young | B60J 1/2088 |
| | | | | 296/97.4 |
| 6,095,231 A | | 8/2000 | Hahn | |
| 6,267,431 B1 | | 7/2001 | Watkins | |
| 6,407,365 B1 | | 6/2002 | De Prete, III | |
| 7,131,683 B1 | * | 11/2006 | Gong | B60J 1/2011 |
| | | | | 160/369 |
| D625,673 S | | 10/2010 | Rodriguez | |
| 9,271,335 B1 | * | 2/2016 | Lamb | H05B 3/06 |
| 10,493,995 B2 | | 12/2019 | Chen | |
| 2006/0021723 A1 | * | 2/2006 | Schneider | D03D 13/008 |
| | | | | 160/370.22 |
| 2006/0082192 A1 | | 4/2006 | Dubay | |
| 2007/0020465 A1 | * | 1/2007 | Thiel | C03C 17/3673 |
| | | | | 428/428 |
| 2008/0197122 A1 | * | 8/2008 | Gober | B60J 1/2091 |
| | | | | 219/203 |
| 2013/0105095 A1 | * | 5/2013 | Anderson | H01Q 1/36 |
| | | | | 160/310 |

(Continued)

FOREIGN PATENT DOCUMENTS

| | | | | |
|---|---|---|---|---|
| CN | 104417496 A | * | 3/2015 | |
| CN | 110385971 A | * | 10/2019 | ............ B60J 1/2088 |

(Continued)

*Primary Examiner* — Lori Lyjak

(57) ABSTRACT

An automatic window shade assembly includes a plurality of shade units that is each integrated into a vehicle and is aligned with a respective one of a plurality of windows in the vehicle. Each of the shade units inhibits sunlight from passing into the vehicle when the shade units are deployed. Each of the shade units exposes the windows when the shade units are stored. Additionally, each of the shade units is in wireless communication with a personal electronic device to remotely control each of the shade units. A heating unit is integrated into a respective shade unit to defrost a windshield in the vehicle. A control is integrated into the vehicle for controlling operational parameters of the heating unit and each of the shade units.

11 Claims, 7 Drawing Sheets

(56) References Cited

U.S. PATENT DOCUMENTS

| | | | |
|---|---|---|---|
| 2016/0303951 A1* | 10/2016 | Masih | B60J 1/2019 |
| 2017/0043747 A1* | 2/2017 | Salter | B60K 35/00 |
| 2017/0136854 A1 | 5/2017 | Dunne | |
| 2018/0361831 A1* | 12/2018 | Buttolo | B60J 1/2041 |
| 2019/0098705 A1* | 3/2019 | Salter | H05B 3/84 |
| 2019/0283712 A1* | 9/2019 | Sanabria | B60S 1/66 |
| 2019/0315372 A1* | 10/2019 | Chen | B60H 1/2226 |
| 2020/0254861 A1* | 8/2020 | Villarreal | B60J 11/08 |
| 2020/0290437 A1* | 9/2020 | Manatpon | B60J 7/0015 |
| 2020/0398648 A1* | 12/2020 | Dernotte | B60H 1/00814 |
| 2021/0129634 A1* | 5/2021 | Woldemariam | B60J 1/2025 |
| 2021/0229534 A1* | 7/2021 | Han | B60J 1/2016 |
| 2021/0252952 A1* | 8/2021 | Iriate | B60J 1/2052 |
| 2021/0283995 A1* | 9/2021 | McDermott | B60J 1/2041 |

FOREIGN PATENT DOCUMENTS

| | | | | |
|---|---|---|---|---|
| CN | 111137110 A | * | 5/2020 | |
| CN | 112078343 A | * | 12/2020 | |
| DE | 10019787 A1 | * | 10/2001 | B60J 1/2011 |
| DE | 20022872 U1 | * | 5/2002 | B60J 1/2011 |
| DE | 20213630 U1 | * | 2/2004 | B60J 1/2088 |
| DE | 102011010568 A1 | * | 8/2012 | B26D 1/46 |
| DE | 202015101386 U1 | * | 4/2015 | H05B 3/141 |
| DE | 202019100952 U1 | * | 4/2019 | B60J 1/2044 |
| EP | 3397021 A1 | * | 10/2018 | B60R 16/0215 |
| GB | 2455718 A | * | 6/2009 | B60J 1/2091 |
| JP | 2001191799 A | * | 7/2001 | |
| JP | 2001233062 A | * | 8/2001 | |
| JP | 3191357 U | * | 6/2014 | |
| KR | 20020096591 A | * | 12/2002 | |
| WO | WO2007026348 | | 3/2007 | |
| WO | WO-2013162818 A1 | * | 10/2013 | E06B 9/42 |
| WO | WO-2016027184 A1 | * | 2/2016 | G05D 23/1927 |

\* cited by examiner

AUTOMATIC WINDOW SHADE ASSEMBLY

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to window shade devices and more particularly pertains to a new window shade device for automatically shading windows in a vehicle. The device includes a plurality of shade units that are each integrated into a vehicle and aligned with a respective window in the vehicle. Each of the shade units is in communication with a personal electronic device for remotely controlling the shade units. Additionally, the device includes a heating unit that is integrated into a respective shade unit for defrosting a windshield in the vehicle.

(2) Description of Related Art Including Information Disclosed Under 37 CFR 1.97 and 1.98

The prior art relates to window shade devices including a variety of window shade devices that each includes a plurality of shade units that each includes flexible shades that are movably integrated into a vehicle for shading respective windows of the vehicle. The prior art discloses a windshield shade device that includes tracks that extend laterally along a windshield, a shade that travels laterally across the windshield for shading the windshield and a heating element integrated into the shade for defrosting the windshield. The prior art discloses a windshield shade that includes a portion of radiant heating fabric for defrosting a windshield.

(h) BRIEF SUMMARY OF THE INVENTION

An embodiment of the disclosure meets the needs presented above by generally comprising a plurality of shade units that is each integrated into a vehicle and is aligned with a respective one of a plurality of windows in the vehicle. Each of the shade units inhibits sunlight from passing into the vehicle when the shade units are deployed. Each of the shade units exposes the windows when the shade units are stored. Additionally, each of the shade units is in wireless communication with a personal electronic device to remotely control each of the shade units. A heating unit is integrated into a respective shade unit to defrost a windshield in the vehicle. A control is integrated into the vehicle for controlling operational parameters of the heating unit and each of the shade units.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
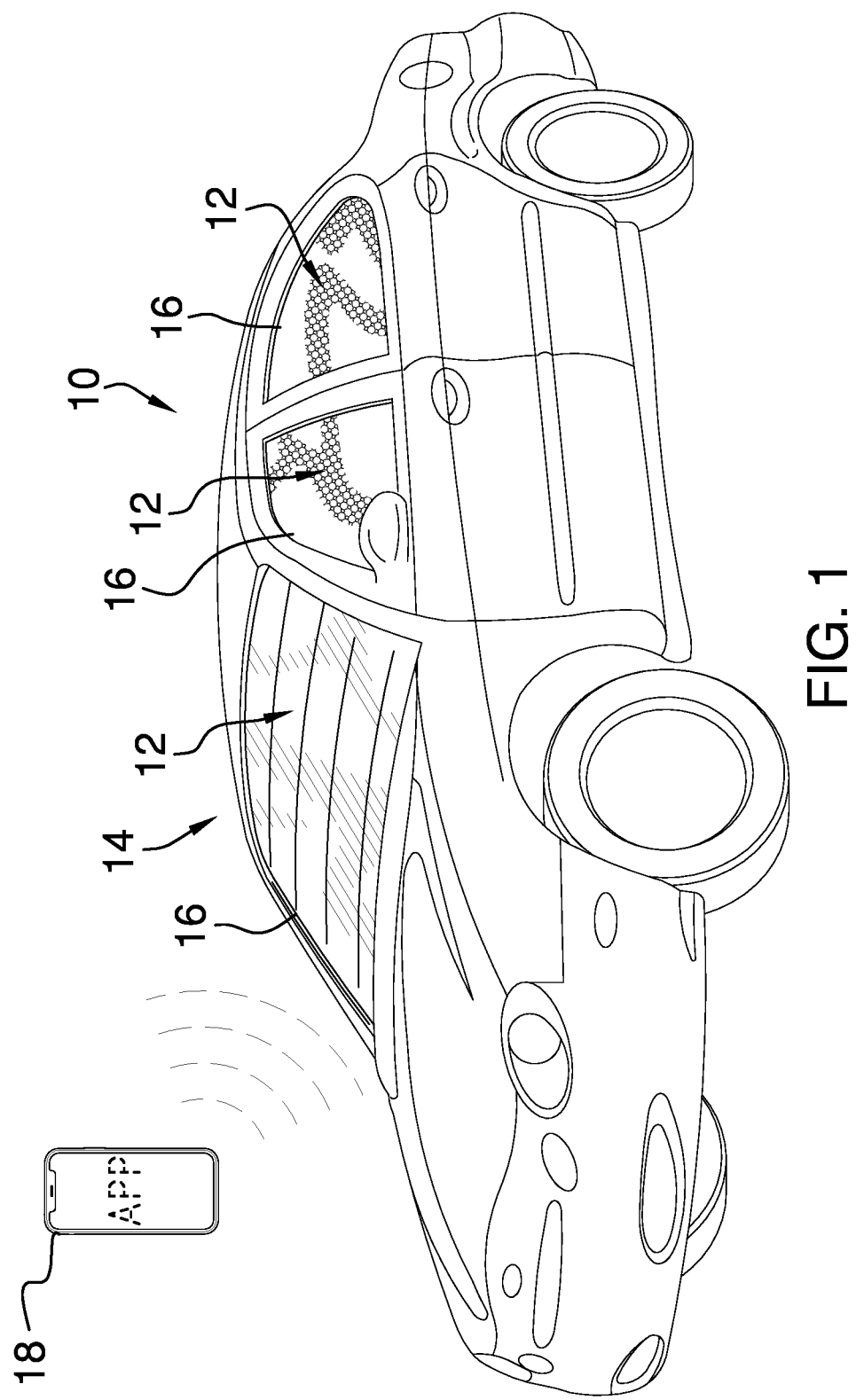
FIG. 1 is an exterior perspective view of an automatic window shade assembly according to an embodiment of the disclosure.
Figure 2:
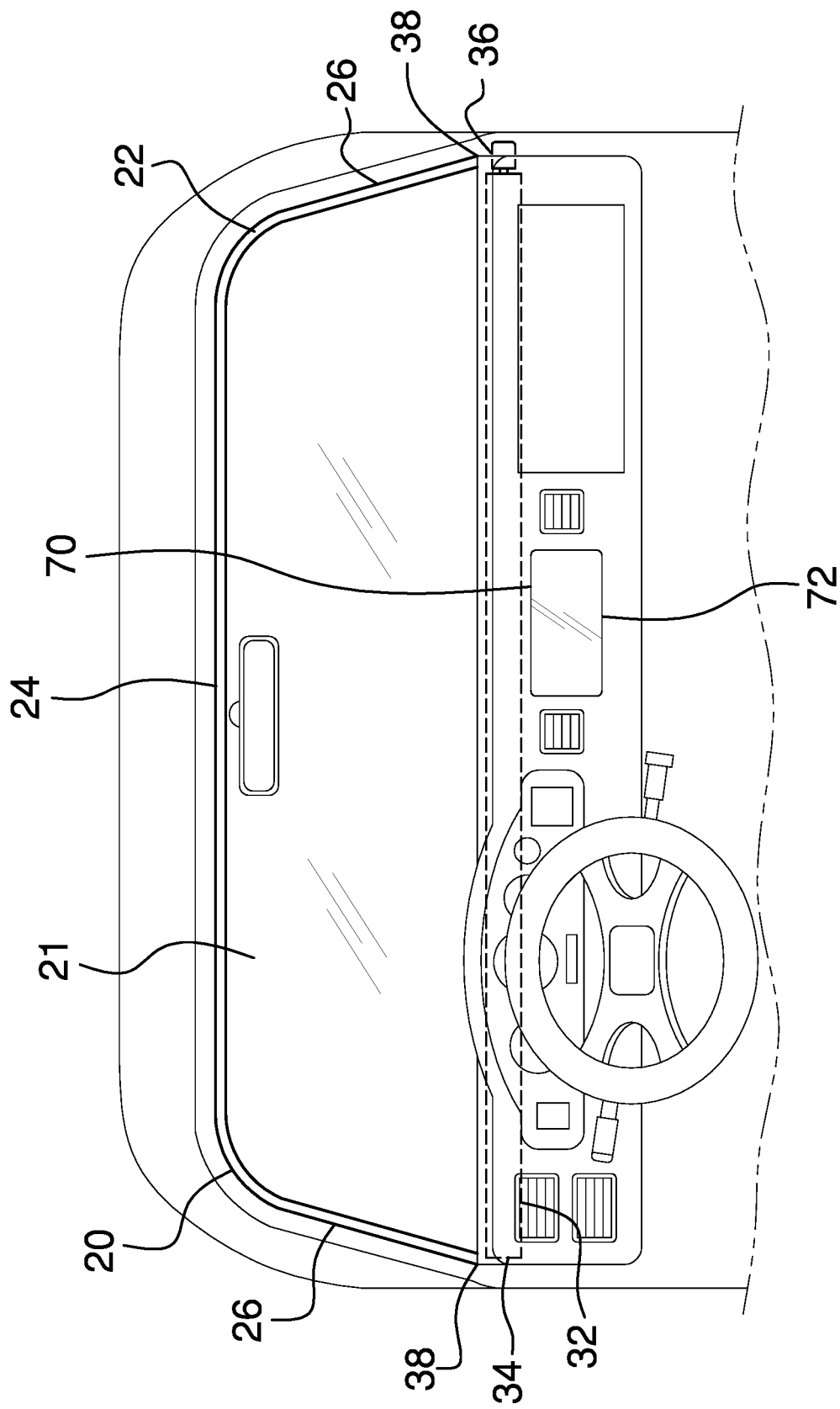
FIG. 2 is an interior view of a vehicle of an embodiment of the disclosure showing a windshield shading unit in a stored position.
Figure 3:
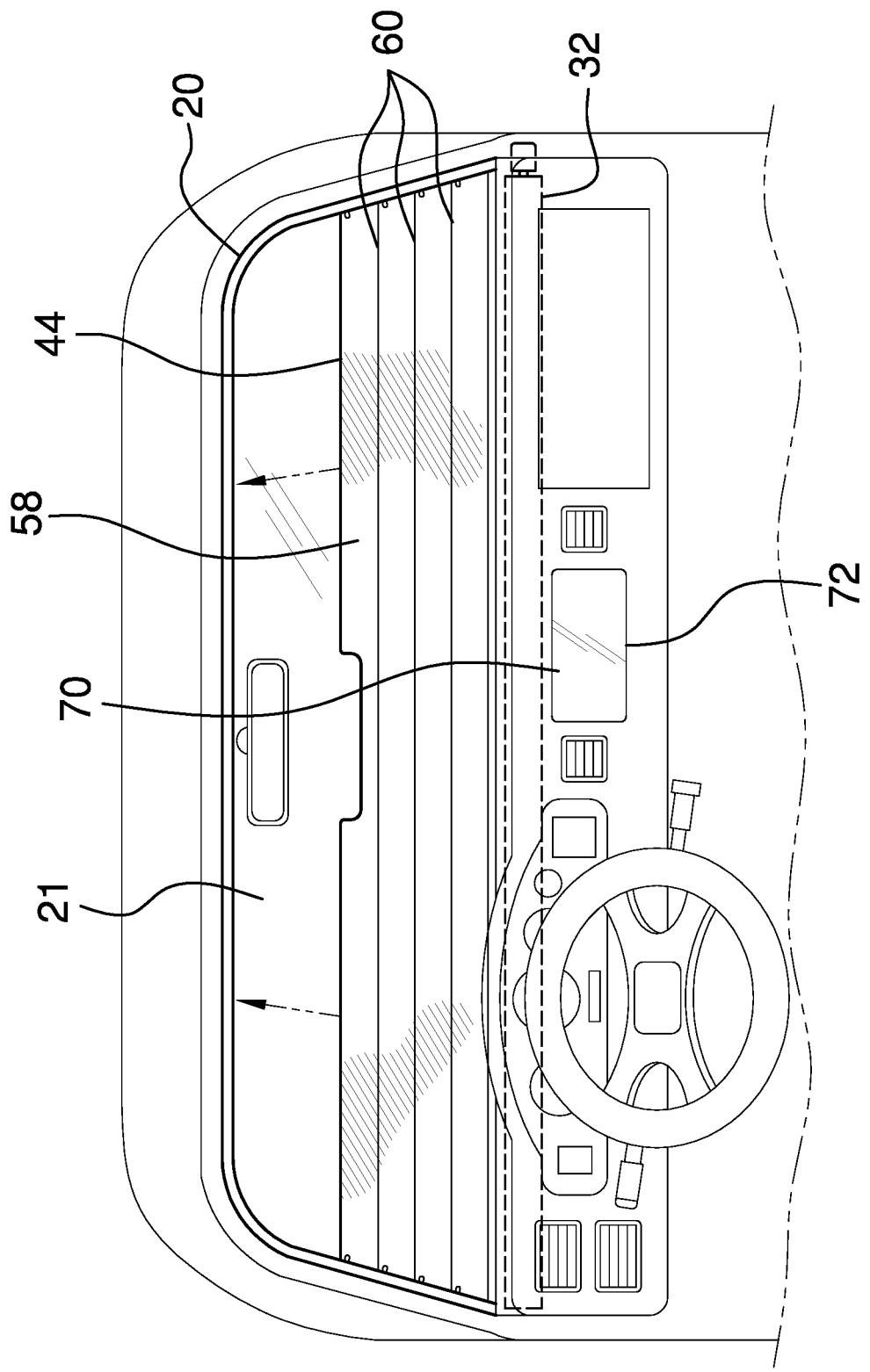
FIG. 3 is an interior view of a vehicle of an embodiment of the disclosure showing a windshield shading unit in a deployed position.
Figure 4:
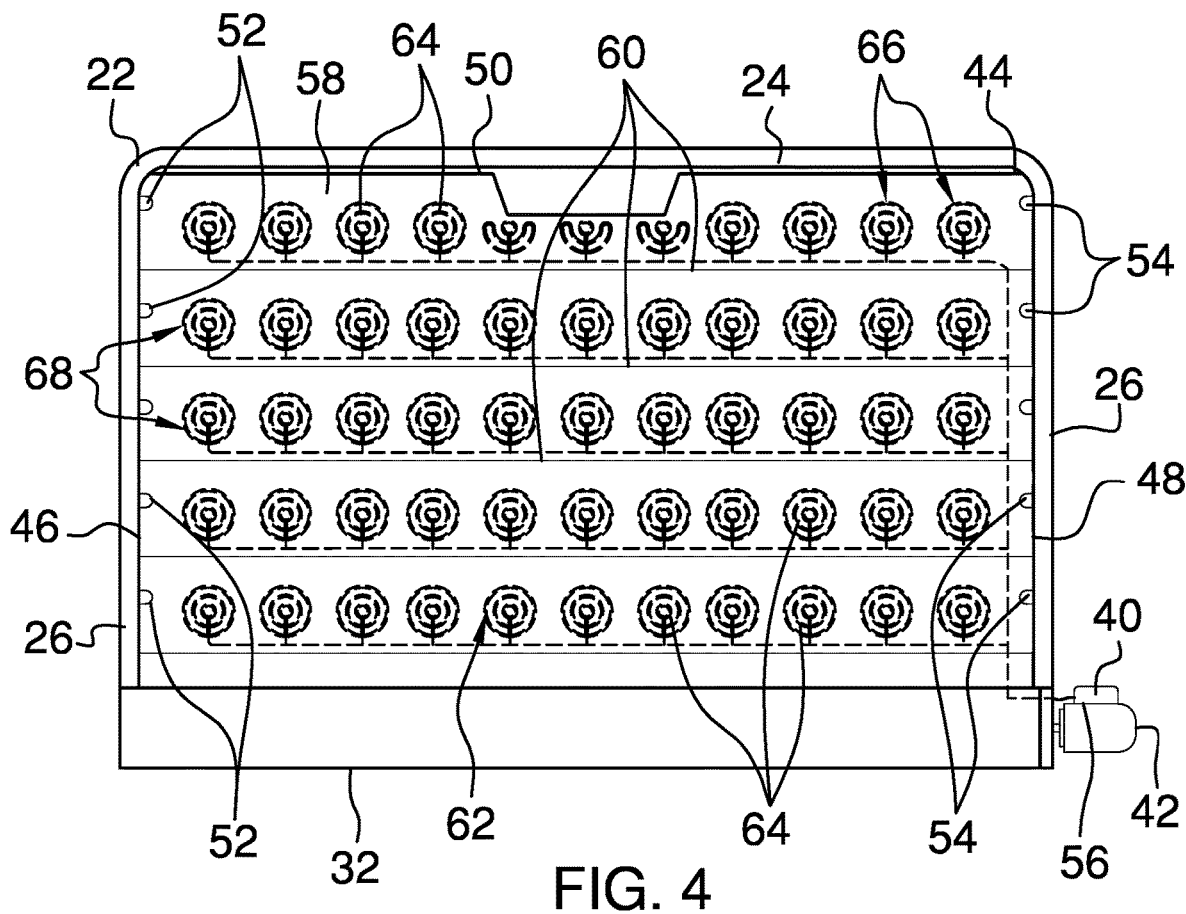
FIG. 4 is a back phantom view of a windshield shading unit of an embodiment of the disclosure.
Figure 5:
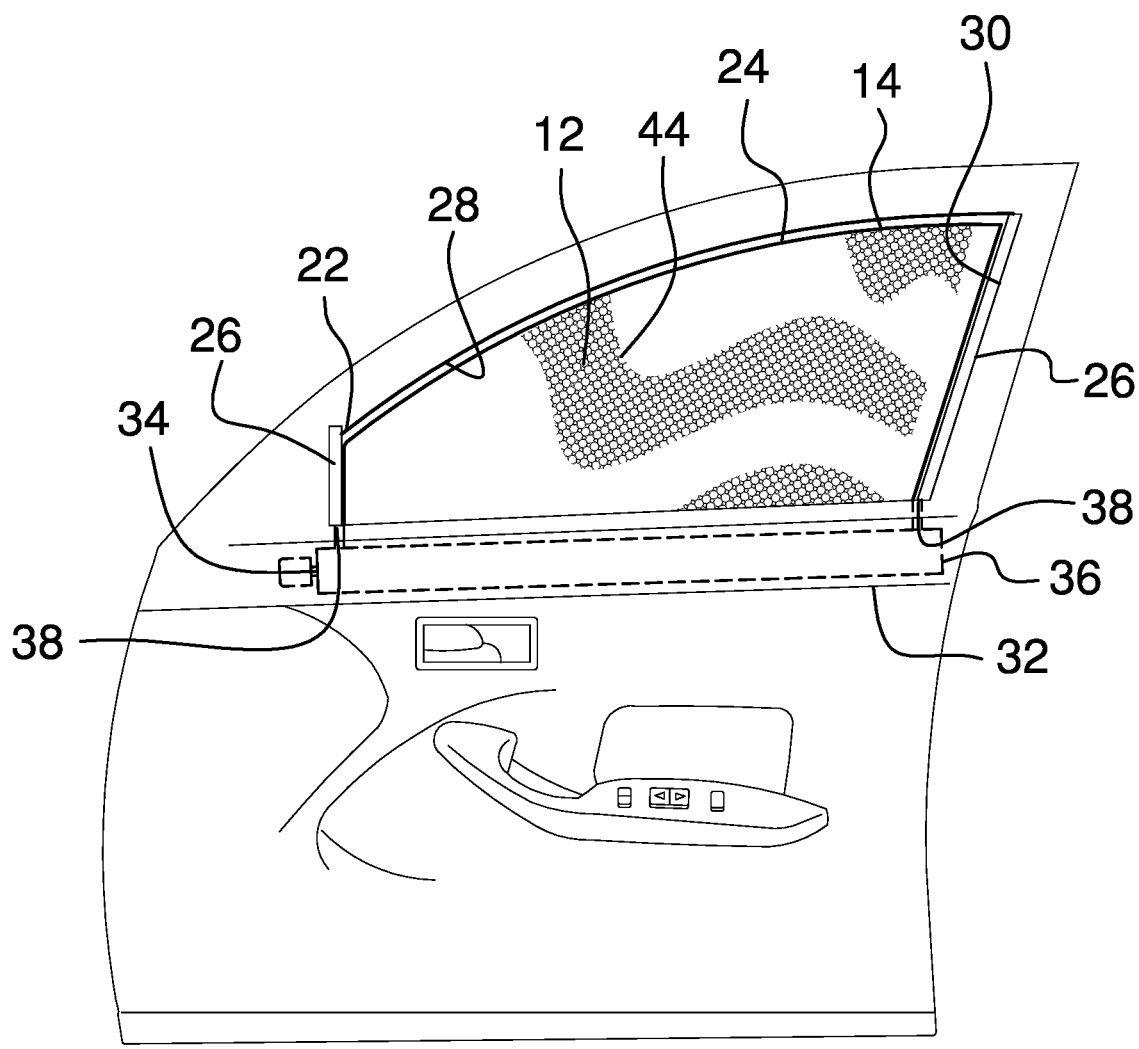
FIG. 5 is a perspective view of shading unit of an embodiment of the disclosure.
Figure 6:
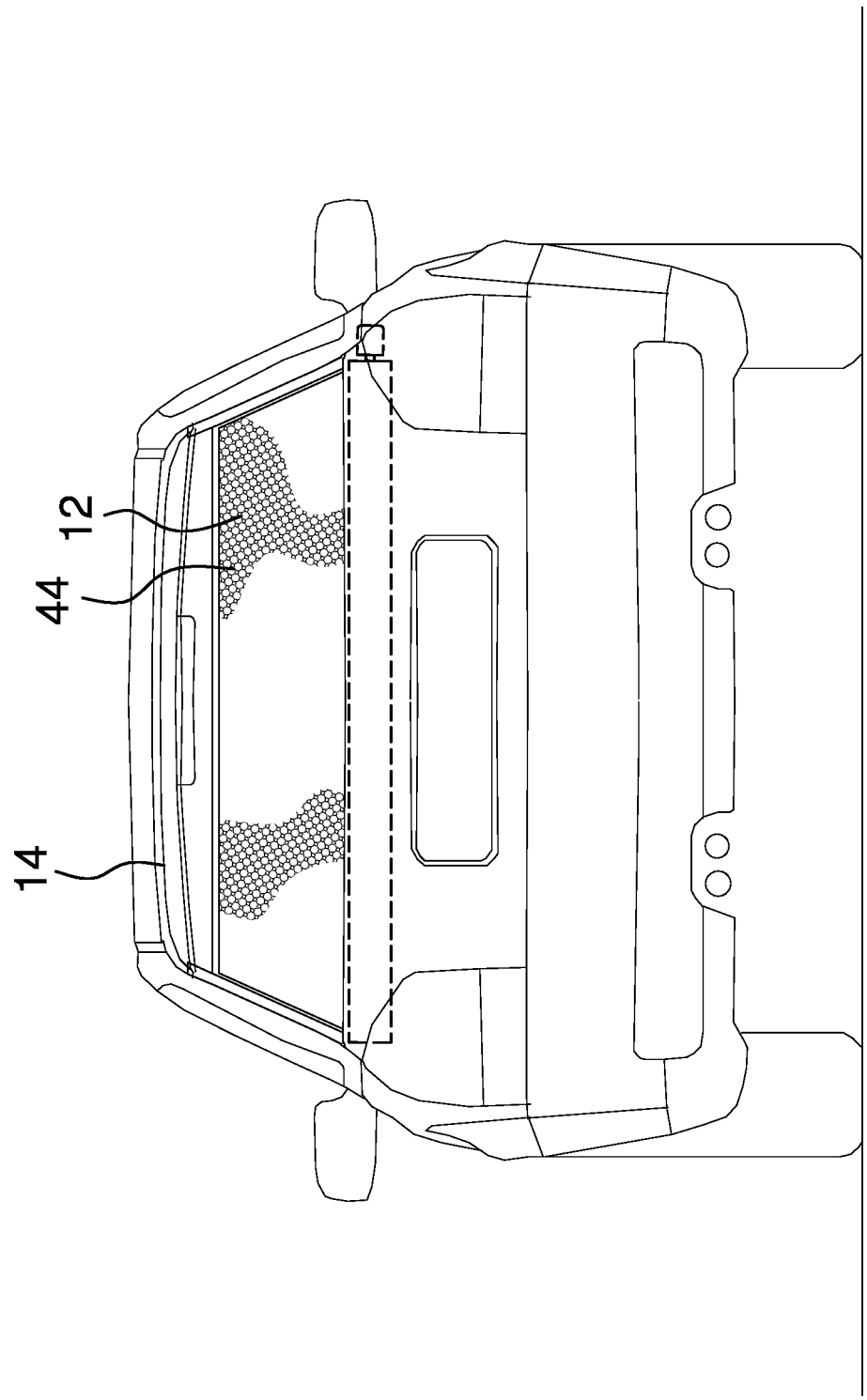
FIG. 6 is a back view of an embodiment of the disclosure.
Figure 7:
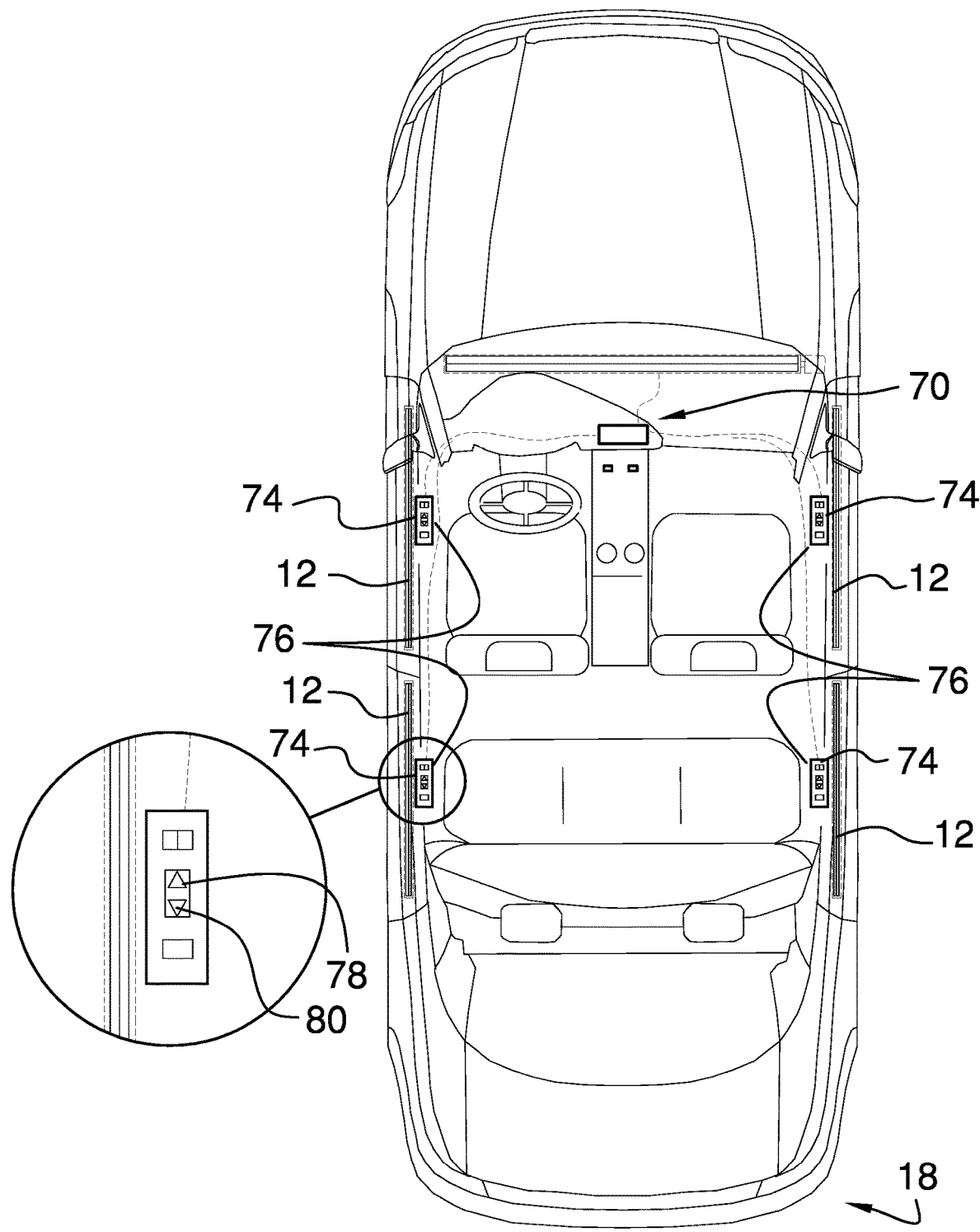
FIG. 7 is a top phantom view of an embodiment of the disclosure.

With reference now to the drawings, and in particular to FIGS. 1 through 7 thereof, a new window shade device embodying the principles and concepts of an embodiment of the disclosure and generally designated by the reference numeral 10 will be described.

As best illustrated in FIGS. 1 through 7, the automatic window shade assembly 10 generally comprises a plurality of shade units 12 that is each integrated into a vehicle 14, and each of the shade units 12 is aligned with a respective one of a plurality of windows 16 in the vehicle 14. Additionally, each of the shade units 12 is actuatable into a deployed position having each of the shade units 12 covering the respective window 16. In this way each of the shade units 12 inhibits sunlight from passing into the vehicle 14. Each of the shade units 12 is actuatable into a stored position such that each of the windows 16 is exposed. Furthermore, each of the shade units 12 is in wireless communication with a personal electronic device 18 thereby facilitating the personal electronic device 18 to remotely control each of the shade units 12. The plurality of shade units 12 includes a windshield shade unit 20 which is integrated into a windshield 21 of the vehicle 14.

Each of the plurality of shade units 12 comprises a track 22 that has a central member 24 extending between a pair of sidelong members 26, and the sidelong members 26 are spaced apart from each other such that the track 22 is substantially U-shaped. The track 22 is positioned in a window opening 30 in the vehicle 14 such that each of the sidelong members 26 and the central member 24 extends around a bounding edge 28 of the window opening 30. Each of the shade units 12 includes a roller 32 that has a first end 34 and a second end 36, and the roller 32 is elongated between the first end 34 and the second end 36. The roller 32 is rotatably integrated within the structure of the vehicle 14 and each of the first end 34 and the second end 36 is aligned with a terminal end 38 of a respective one of the sidelong members 26 of the track 22.

Each of the shade units 12 includes a control circuit 40 that is electrically coupled to a power source 41 comprising an electrical system of the vehicle 14. The control circuit 40 receives a deploy input, a storing input and a heat input. Each of the shade units 12 includes a motor 42 that is attached to the roller 32 and the motor 42 is electrically coupled to the control circuit 40. The motor 42 is actuated into a deploying condition when the control circuit 40 receives the control 70 input, and the motor 42 rotates the roller 32 in a first direction when the motor 42 is actuated into the deploying condition. The motor 42 is actuated into a storing condition when the control circuit 40 receives the storing input, and the motor 42 rotates the roller 32 in a second direction when the motor 42 is actuated into the storing condition.

Each of the shade units 12 includes a shade 44 that is rolled around the roller 32. The shade 44 has a first lateral edge 46, a second lateral edge 48 and a top edge 50, and each of the first lateral edge 46 and the second lateral edge 48 slidably engages a respective one of the sidelong members 26 of the track 22. The shade 44 travels upwardly along each of the sidelong members 26 until the top edge 50 engages the central member 24 of the track 22 when the roller 32 rotates in the first direction. Conversely, the shade 44 travels downwardly along each of the sidelong members 26 until the shade 44 is rolled around the roller 32 when the roller 32 rotates in the second direction. The shade 44 is comprised of an opaque material to inhibit sunlight from passing through the shade 44.

Each of the shade units 12 includes a plurality of first engagements 52 that is each coupled to the first lateral edge 46 of the shade 44. The first engagements 52 are spaced apart from each other and are distributed along the first lateral edge 46, and each of the first engagements 52 slidably engages a respective one of the sidelong members 26 of the track 22. A plurality of second engagements 54 is each coupled to the second lateral edge 48 of the shade 44. The second engagements 54 are spaced apart from each other and are distributed along the second lateral edge 48, and each of the second engagements 54 slidably engages a respective one of the sidelong members 26 of the track 22.

Each of the shade units 12 includes a receiver 56 that is integrated into the motor 42 and the receiver 56 is electrically coupled to the control circuit 40. Additionally, the receiver 56 is in wireless communication with the personal electronic device 18. The control circuit 40 receives the deploy input when the receiver 56 receives a deploy command from the personal electronic device 18. Furthermore, the control circuit 40 receives the storing input when the receiver 56 receives a store command from the personal electronic device 18. The receiver 56 may comprise a radio frequency receiver or the like and the receiver 56 may employ Bluetooth communication protocols. The personal electronic device 18 may comprise a smart phone or other similar type of device that has wireless communication capabilities.

The shade 44 associated with each of the window shade units 12 comprises a mesh material that of sufficient density to block the majority of sunlight that strikes with shade 44. The shade 44 associated with the windshield shade unit 20 comprises a panel 58 which has a plurality of fold lines 60 each extending between the first lateral edge 46 and the second lateral edge 48 thereby facilitating the panel 58 to be folded along each of the fold lines 60. The fold lines 60 are spaced apart from each other and are distributed along a full height of the panel 58 thereby facilitating the panel 58 to be rolled around the roller 32 associated with the windshield shade unit 20. Furthermore, the panel 58 is comprised of a thermally conductive material.

A heating unit 62 is integrated into the windshield shade unit 20 and the heating unit 62 is in thermal communication with the windshield shade unit 20 such that the heating unit 62 heats the windshield shade unit 20 when the heating unit 62 is turned on. In this way the windshield shade unit 20 can defrost the windshield during winter months. The heating unit 62 comprises a plurality of heating elements 64 that is each integrated into the panel 58 comprising the shade 44 of the windshield shade unit 20. The heating elements 64 are arranged into a plurality of columns 66 and rows 68 in the panel 58. Additionally, each of the heating elements 64 is electrically coupled to the control circuit 40 and each of the heating elements 64 is turned on when the control circuit 40 receives the heat input. Each of the heating elements 64 may comprise an electric heating coil or the like and each of the heating elements 64 may have an operational temperature of approximately 100.0 degrees Fahrenheit.

A control 70 is integrated into the vehicle 14 and the control 70 is positioned within a cabin of the vehicle 14 such that the control 70 is accessible to a driver of the vehicle 14. The control 70 is electrically coupled to the control circuit 40 and the control 70 comprises a touch screen 72 that is integrated into a dashboard of the vehicle 14. The touch screen 72 is electrically coupled to the control circuit 40 and the touch screen 72 displays indicia comprising a graphical user interface for controlling the plurality of shade units 12 and the heating unit 62. The touch screen 72 may comprise a liquid crystal touch screen or other type of electronic display.

The control 70 includes a plurality of control buttons 74 that is each movably integrated into a respective one of a plurality of armrests 76 in the vehicle 14. In this way each of the control buttons 74 is accessible to a respective occupant of the vehicle 14. Each of the control buttons 74 is electrically coupled to the control circuit 40 for controlling operational parameters of a respective one of the shade units 12. The plurality of control buttons 74 may include a plurality of up buttons 78 and a plurality of down buttons 80. Each of the up buttons 78 may actuate the respective shade 44 unit into the deployed position. Conversely, each of the down buttons 80 may actuate the respective shade 44 unit into the stored position.

In use, the personal electronic device 18 is manipulated to actuate the shade units 12 into the deployed position to shade the interior of the vehicle 14. In this way the interior of the vehicle 14 is inhibited from reaching dangerously high temperatures when the vehicle 14 is parked. Conversely, the personal electronic device 18 is manipulated to actuate the shade units 12 into the stored position to allow full sunlight to enter the vehicle 14. The shade units 12 can be simultaneously or individually actuated into the deployed position or the stored position, depending on the user's preference. Additionally, each of the shade units 12 can be controlled with the touch screen 72 or with the control buttons 74. The heating unit 62 can be turned on to facilitate the windshield 21 to be defrosted when the windshield shade unit 20 is in the deployed position.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An automatic window shade assembly for automatically shading windows in a vehicle, said assembly comprising:
    a plurality of shade units, each of said shade units being integrated into a vehicle, each of said shade units being aligned with a respective one of a plurality of windows in the vehicle, each of said shade units being actuatable into a deployed position having each of said shade units covering the respective window wherein each of said shade units is configured to inhibit sunlight from passing into the vehicle, each of said shade units being actuatable into a stored position such that each of the windows is exposed, each of said shade units being in wireless communication a personal electronic device thereby facilitating the personal electronic device to remotely control each of said shade units, said plurality of shade units including a windshield shade unit;
    a heating unit being integrated into said windshield shade unit, said heating unit being in thermal communication with said windshield shade unit such that said heating unit heats said windshield shade unit when said heating unit is turned on wherein said windshield shade unit is configured to defrost the windshield;
    a control being integrated into the vehicle, said control being positioned within a cabin of the vehicle wherein said control is configured to be accessible to a driver of the vehicle, said control being in communication with said heating unit and each of said shade units for controlling operational parameters of said heating unit and said shade units; and
    wherein each of said plurality of shade units comprises a track having a central member extending between a pair of sidelong members, said sidelong members being spaced apart from each other such that said track is substantially U-shaped, said track being positioned in a window opening in the vehicle such that each of said sidelong members and said central member extends around a bounding edge of the window opening.

2. The assembly according to claim 1, wherein each of said shade units comprises a roller having a first end and a second end, said roller being elongated between said first end and said second end, said roller being rotatably integrated within the structure of the vehicle, each of said first end and said second end being aligned with a terminal end of a respective one of said sidelong members of said track.

3. The assembly according to claim 2, wherein each of said shade units comprises:
    a control circuit being electrically coupled to a power source comprising an electrical system of the vehicle, said control circuit receiving a deploy input, said control circuit receiving a storing input, said control circuit receiving a heat input; and
    a motor being attached to said roller, said motor being electrically coupled to said control circuit, said motor being actuated into a deploying condition when said control circuit receives said control input, said motor rotating said roller in a first direction when said motor is actuated into said deploying condition, said motor being actuated into a storing condition when said control circuit receives said storing input, said motor rotating said roller in a second direction when said motor is actuated into said storing condition.

4. The assembly according to claim 3, wherein each of said shade units includes a shade being rolled around said roller, said shade having a first lateral edge, a second lateral edge and a top edge, each of said first lateral edge and said second lateral edge slidably engaging a respective one of said sidelong members of said track, said shade travelling upwardly along each of said sidelong members until said top edge engages said central member of said track when said roller rotates in said first direction, said shade travelling downwardly along each of said sidelong members until said shade is rolled around said roller when said roller rotates in said second direction, said shade being comprised of an opaque material wherein said shade is configured to inhibit sunlight from passing through said shade.

5. The assembly according to claim 4, wherein each of said shade units includes a plurality of first engagements, each of said first engagements being coupled to said first lateral edge of said shade, said first engagements being spaced apart from each other and being distributed along said first lateral edge, each of said first engagements slidably engaging a respective one of said sidelong members of said track.

6. The assembly according to claim 5, wherein each of said shade units includes a plurality of second engagements, each of said second engagements being coupled to said second lateral edge of said shade, said second engagements being spaced apart from each other and being distributed along said second lateral edge, each of said second engagements slidably engaging a respective one of said sidelong members of said track.

7. The assembly according to claim 3, further comprising a receiver being integrated into said motor, said receiver being electrically coupled to said control circuit, said receiver being in wireless communication with the personal electronic device, said control circuit receiving said deploy input when said receiver receives a deploy command from the personal electronic device, said control circuit receiving said storing input when said receiver receives a store command from the personal electronic device.

8. The assembly according to claim 4, wherein said shade associated with said windshield shade unit comprises a panel having a plurality of fold lines each extending between said first lateral edge and said second lateral edge thereby facilitating said panel to be folded along each of said fold lines, said fold lines being spaced apart from each other and being distributed along a full height of said panel thereby facilitating said panel to be rolled around said roller associated with said windshield shade unit, said panel being comprised of a thermally conductive material.

9. The assembly according to claim 8, wherein said heating unit comprises a plurality of heating elements, each of said heating elements being integrated into said panel comprising said shade of said windshield shade unit, said heating elements being arranged into a plurality of columns and rows in said panel, each of said heating elements being electrically coupled to said control circuit, each of said heating elements being turned on when said control circuit receives said heat input.

10. The assembly according to claim 3, wherein said control comprises:
 a touch screen being integrated into a dashboard of the vehicle, said touch screen being electrically coupled to said control circuit, said touch screen displaying indicia comprising a graphical user interface for controlling said plurality of shade units and said heating unit; and
 a plurality of control buttons, each of said control buttons being movably integrated into a respective one of a plurality of armrests in the vehicle wherein each of said control buttons is configured to be accessible to a respective occupant of the vehicle, each of said control buttons being electrically coupled to said control circuit for controlling operational parameters of a respective one of said shade units.

11. An automatic window shade assembly for automatically shading windows in a vehicle, said assembly comprising:
 a plurality of shade units, each of said shade units being integrated into a vehicle, each of said shade units being aligned with a respective one of a plurality of windows in the vehicle, each of said shade units being actuatable into a deployed position having each of said shade units covering the respective window wherein each of said shade units is configured to inhibit sunlight from passing into the vehicle, each of said shade units being actuatable into a stored position such that each of the windows is exposed, each of said shade units being in wireless communication a personal electronic device thereby facilitating the personal electronic device to remotely control each of said shade units, said plurality of shade units including a windshield shade unit, each of said plurality of shade units comprising:
  a track having a central member extending between a pair of sidelong members, said sidelong members being spaced apart from each other such that said track is substantially U-shaped, said track being positioned in a window opening in the vehicle such that each of said sidelong members and said central member extends around a bounding edge of the window opening;
  a roller having a first end and a second end, said roller being elongated between said first end and said second end, said roller being rotatably integrated within the structure of the vehicle, each of said first end and said second end being aligned with a terminal end of a respective one of said sidelong members of said track;
  a control circuit being electrically coupled to a power source comprising an electrical system of the vehicle, said control circuit receiving a deploy input, said control circuit receiving a storing input, said control circuit receiving a heat input;
  a motor being attached to said roller, said motor being electrically coupled to said control circuit, said motor being actuated into a deploying condition when said control circuit receives said control input, said motor rotating said roller in a first direction when said motor is actuated into said deploying condition, said motor being actuated into a storing condition when said control circuit receives said storing input, said motor rotating said roller in a second direction when said motor is actuated into said storing condition;
  a shade being rolled around said roller, said shade having a first lateral edge, a second lateral edge and a top edge, each of said first lateral edge and said second lateral edge slidably engaging a respective one of said sidelong members of said track, said shade travelling upwardly along each of said sidelong members until said top edge engages said central member of said track when said roller rotates in said first direction, said shade travelling downwardly along each of said sidelong members until said shade is rolled around said roller when said roller rotates in said second direction, said shade being comprised of an opaque material wherein said shade is configured to inhibit sunlight from passing through said shade;
  a plurality of first engagements, each of said first engagements being coupled to said first lateral edge of said shade, said first engagements being spaced apart from each other and being distributed along said first lateral edge, each of said first engagements slidably engaging a respective one of said sidelong members of said track;
  a plurality of second engagements, each of said second engagements being coupled to said second lateral edge of said shade, said second engagements being spaced apart from each other and being distributed along said second lateral edge, each of said second engagements slidably engaging a respective one of said sidelong members of said track;
  a receiver being integrated into said motor, said receiver being electrically coupled to said control circuit, said receiver being in wireless communication with the personal electronic device, said control circuit receiving said deploy input when said receiver receives a deploy command from the personal electronic device, said control circuit receiving said storing input when said receiver receives a store command from the personal electronic device; and
  wherein said shade associated with said windshield shade unit comprises a panel having a plurality of fold lines each extending between said first lateral edge and said second lateral edge thereby facilitating said panel to be folded along each of said fold lines, said fold lines being spaced apart from each other and being distributed along a full height of said panel thereby facilitating said panel to be rolled around said roller associated with said windshield shade unit, said pane being comprised of a thermally conductive material;

a heating unit being integrated into said windshield shade unit, said heating unit being in thermal communication with said windshield shade unit such that said heating unit heats said windshield shade unit when said heating unit is turned on wherein said windshield shade unit is configured to defrost the windshield, said heating unit comprising a plurality of heating elements, each of said heating elements being integrated into said panel comprising said shade of said windshield shade unit, said heating elements being arranged into a plurality of columns and rows in said panel, each of said heating elements being electrically coupled to said control circuit, each of said heating elements being turned on when said control circuit receives said heat input; and a control being integrated into the vehicle, said control being positioned within a cabin of the vehicle wherein said control is configured to be accessible to a driver of the vehicle, said control being electrically coupled to said control circuit, said control comprising:

a touch screen being integrated into a dashboard of the vehicle, said touch screen being electrically coupled to said control circuit, said touch screen displaying indicia comprising a graphical user interface for controlling said plurality of shade units and said heating unit; and a plurality of control buttons, each of said control buttons being movably integrated into a respective one of a plurality of armrests in the vehicle wherein each of said control buttons is configured to be accessible to a respective occupant of the vehicle, each of said control buttons being electrically coupled to said control circuit for controlling operational parameters of a respective one of said shade units.

* * * * *